United States Patent
Rainer

(10) Patent No.: US 10,767,545 B2
(45) Date of Patent: Sep. 8, 2020

(54) METHOD OF PRE-HEATING A INTERNAL COMBUSTION ENGINE BY OIL AND JACKET WATER COOLER

(71) Applicant: INNIO Jenbacher GmbH & Co OG, Jenbach (AT)

(72) Inventor: Mario Rainer, Tirol (AT)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 19 days.

(21) Appl. No.: 16/273,313

(22) Filed: Feb. 12, 2019

(65) Prior Publication Data
US 2019/0257239 A1 Aug. 22, 2019

(30) Foreign Application Priority Data
Feb. 21, 2018 (EP) .................................. 18157808

(51) Int. Cl.
*F01P 5/12* (2006.01)
*F02G 5/00* (2006.01)
(Continued)

(52) U.S. Cl.
CPC ................. *F01P 5/12* (2013.01); *F01M 5/02* (2013.01); *F02G 5/00* (2013.01); *F02N 19/10* (2013.01); *F01P 7/048* (2013.01); *F02B 29/0443* (2013.01)

(58) Field of Classification Search
CPC .... F01P 5/12; F01P 7/048; F01M 5/02; F02G 5/00; F02B 29/0443; F02N 19/10
See application file for complete search history.

(56) References Cited

U.S. PATENT DOCUMENTS 2,993,487 A * 7/1961 Konrad ................. F02N 99/008
  123/142.5 R
3,450,109 A * 6/1969 Gratzmuller .......... C07F 9/4075
  123/27 A
(Continued)

FOREIGN PATENT DOCUMENTS

| CN | 203383888 U | 1/2014 |
| EP | 1096120 A2 | 5/2001 |
| WO | 2017110900 A1 | 6/2017 |

OTHER PUBLICATIONS

European Search Report and Written Opinion dated Sep. 11, 2018 which was issued in connetion with EP 18157808.9 which was filed on Feb. 21, 2018.

*Primary Examiner* — Syed O Hasan
(74) *Attorney, Agent, or Firm* — Fletcher Yoder, P.C.

(57) ABSTRACT

Provided is an internal combustion engine, comprising at least one cooling device for cooling at least one operational liquid of the internal combustion engine during and/or after operation of the internal combustion engine. The at least one cooling device has at least one heat exchanger and lines for transporting the at least one operational liquid to and from the at least one heat exchanger. The heat exchanger exchanges heat with a cooling medium, which cooling medium has during the operation of the internal combustion engine a lower temperature than the at least one operational liquid of the internal combustion engine. Heat is exchanged by the heat exchanger between the at least one operational liquid and the cooling medium, which cooling medium has before and/or during a starting operation of the internal combustion engine a higher temperature than the at least one operational liquid of the internal combustion engine.

20 Claims, 3 Drawing Sheets

(51) Int. Cl.
*F02N 19/10* (2010.01)
*F01M 5/02* (2006.01)
*F01P 7/04* (2006.01)
*F02B 29/04* (2006.01)

(56) References Cited

U.S. PATENT DOCUMENTS

| | | | | |
|---|---|---|---|---|
| 4,700,047 A | * | 10/1987 | Crossett | F02M 31/10 |
| | | | | 123/549 |
| 2016/0376977 A1 | * | 12/2016 | Watanabe | F01P 7/16 |
| | | | | 123/41.08 |

* cited by examiner

METHOD OF PRE-HEATING A INTERNAL COMBUSTION ENGINE BY OIL AND JACKET WATER COOLER

FIELD OF TECHNOLOGY

The subject disclosure concerns an internal combustion engine having the features of the classifying portion of claim 1 and a method for pre-heating an internal combustion engine having the features of the classifying portion of claim 7.

BACKGROUND

Internal combustion engines known in the state of the art comprise a cooling device, which is used for cooling the internal combustion engine during and/or after operation of the internal combustion engine. Frequently, these cooling devices comprise heat exchangers, which heat exchangers exchange heat between an operational liquid (coming from the internal combustion engine) and cooling medium. The operational liquid could for example be a cooling water of a cooling water circuit, which cooling water circuit cools cylinders or other components of the internal combustion engine during operation or oil used to lubricate moving parts of the internal combustion engine. For the transport of the operational liquid between the internal combustion engine and the heat exchanger lines are provided. The cooling medium can vary depending on the field of application of the internal combustion engine. A frequently used cooling medium is water, which in a water circuit transports thermal energy away from the internal combustion engine. For cooling the internal combustion engine during operation the cooling medium has a lower temperature level than the operational liquid of the internal combustion engine.

As known from the state of the art internal combustion engines have to be pre-heated before starting. A pre-heating before starting of the internal combustion engine reduces thermal stress of the internal combustion engine, which would occur if the internal combustion engine would not be pre-heated before starting. This thermal stress may result in defects of components, either immediately or after a certain period of time, wherein the lifetime of a component would be reduced significantly. Additionally, the cold start behavior of the engine is improved, if the temperature of the operational liquids (such as cooling liquid, oil, fuel or air) is increased relatively to cold ambient air.

It is commonly known to provide internal combustion engines with pre-heating devices. Such pre-heating devices can comprise, for example, electrical pre-heaters or plate heat exchangers. Cooling fluid or operational liquid of the internal combustion engine is led through the pre-heating devices before and/or during the starting operation of the internal combustion engine by use of an externally driven pump (not driven by the internal combustion engine).

A disadvantage of such a procedure is that a lot of energy is required for the heating of the pre-heating device, especially if electrical heating devices are used. A further disadvantage is the high costs for providing such pre-heating devices.

SUMMARY OF THE DISCLOSURE

The purpose of the subject disclosure is to provide an internal combustion engine and a method for pre-heating an internal combustion engine, wherein manufacturing and/or operating costs are reduced.

This is being achieved by an internal combustion engine having the features of claim 1 and a method for pre-heating an internal combustion engine having the features of claim 7.

A starting operation of the internal combustion engine extends from actuating a starting switch to reach a pre-defined operation state of the internal combustion engine, e.g. reaching nominal rotational speed of the internal combustion engine.

According to the subject disclosure it is provided that during and/or before a starting operation of the internal combustion engine the cooling device is configured to pre-heat the internal combustion engine, wherein heat is exchanged by the heat exchanger between the at least one operational liquid and the cooling medium, which cooling medium has before and/or during the starting operation of the internal combustion engine a higher temperature level than the at least one operational liquid of the internal combustion engine.

In this way, according to the disclosure already existing thermal energy carried by the cooling medium can be used for pre-heating the internal combustion engine. It is not necessary to generate additional thermal energy at the place of the internal combustion engine. The thermal level of the cooling medium, which during operation (after finishing the stating operation) is low enough for cooling the internal combustion engine, is high enough before/or during a starting operation to pre-heat the internal combustion engine. No further components for heating are necessary. This reduces the costs of manufacturing an internal combustion engine.

Embodiments of the disclosure are defined by the dependent claims.

It can be provided that the internal combustion engine is a stationary reciprocating piston engine driving a generator, which generator could provide a power supply network with electrically energy.

In an embodiment of the disclosure at least one pump—an electrical pump—is provided, wherein the pump is configured to pump at least one operational liquid to and from the at least one cooling device before and/or during a starting operation of the internal combustion engine. It can be provided that the at least one pump can be driven independently from the internal combustion engine, so that the at least one pump could start to work before the internal combustion engine is started. This could for example be done by providing an electrical pump. Furthermore the at least one pump can be provided at a bypass line, wherein the bypass line can be fluidically connected to the at least one heat exchanger before and/or during a starting operation of the internal combustion engine. By such an embodiment it can be provided that the pump for pre-heating is used only before and/or during the starting operation of the internal combustion engine in connection with the heat exchanger. After pre-heating the bypass line can be closed and the pump (which could be switched off after starting the internal combustion engine) does not form an obstacle for the circulation of the at least one operational liquid. During the operation of the internal combustion engine the pumping of the at least one operation liquid can be done by a further pump which is driven by the internal combustion engine.

Additionally or alternatively at least two cooling devices can be provided for cooling at least one operational liquid of the internal combustion engine, wherein a first of the at least two cooling devices is configured to cool at least one cooling water circuit of the internal combustion engine and wherein a second of the at least two cooling devices is configured to cool at least one oil circuit of the internal combustion engine, wherein the at least one cooling water circuit and the at least one oil circuit of the internal combustion engine can be heated by the at least two cooling devices before and/or during a starting operation of the internal combustion engine.

Furthermore, at least one further cooling device can be provided for at least one external component of the internal combustion engine, wherein the at least one further cooling device is configured to heat the at least one further component of the internal combustion engine before and/or during a starting operation of the internal combustion engine. In this way, an external component of the internal combustion engine, for example a turbo charger and/or an intercooler and/or a fuel cooler can be pre-heated.

Protection is also sought for a method for pre-heating an internal combustion engine, wherein the internal combustion engine comprises at least one cooling device for cooling at least one operational liquid of the internal combustion engine during and/or after operation of the internal combustion engine by an cooling medium, wherein the cooling medium has during the operation of the internal combustion engine a lower temperature level than the at least one operational liquid of the internal combustion engine, wherein the at least one cooling device is used before and/or during a starting operation of the internal combustion engine to pre-heat the internal combustion engine by an cooling medium, wherein the cooling medium has before and/or during the starting operation of the internal combustion engine a higher temperature level than the at least one operational liquid of the internal combustion engine.

BRIEF DESCRIPTION OF THE DRAWINGS

Further details and advantages of the present disclosure will be described with reference to the specific description hereinafter. In the drawing.

DETAILED DESCRIPTION

Figure 1:
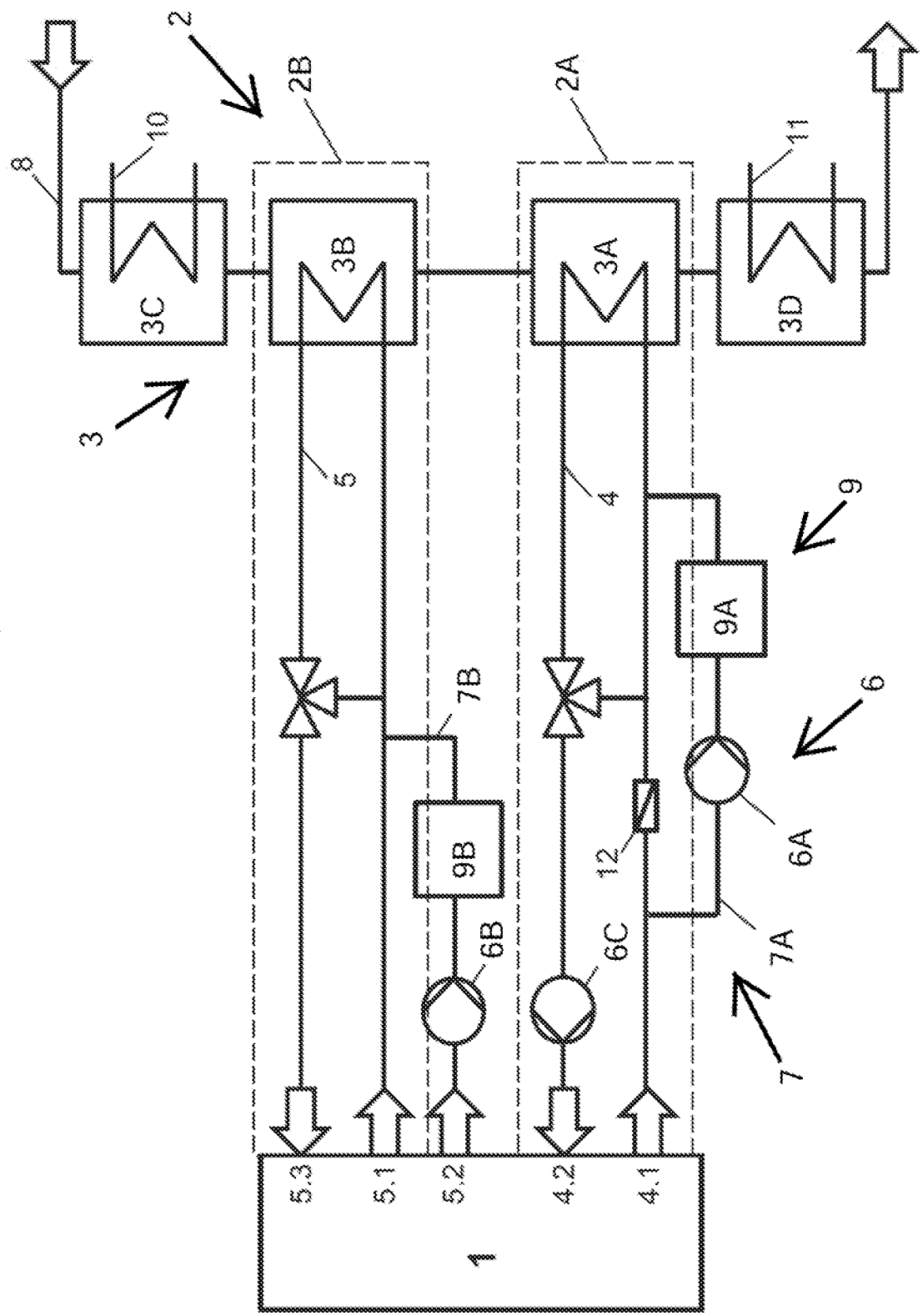
FIG. 1 shows an embodiment of an internal combustion engine having a cooling device as known from the state of the art.

FIG. 1 shows an internal combustion engine 1 having a cooling device 2 as known from the state of the art. More particularly, the internal combustion engine 1 shown in FIG. 1 has two cooling devices 2 (e.g., first cooler 2A and second cooler 2B). By the line 4 cooling water of the internal combustion engine 1 can be led from the internal combustion engine 1 (connection point 4.1) to a heat exchanger 3 (e.g., first heat exchanger 3A) and from the first heat exchanger 3A back to the internal combustion engine 1 (to the connection point 4.2 of the internal combustion engine 1). A pump 6 (e.g., third pump 6C) is provided in the line 4 leading the cooling water circuit of the internal combustion engine 1 back to the internal combustion engine 1, which third pump 6C is driven by the internal combustion engine 1 and keeps the cooling water circuit during the operation of the internal combustion engine 1 in motion. By using line 5, oil of the internal combustion engine 1 can be led from the internal combustion engine 1 (connection point 5.1) to a heat exchanger 3 (e.g., second heat exchanger 3B) and from the second heat exchanger 3B back to the internal combustion engine 1 (to the connection point 5.3 of the internal combustion engine 1). Furthermore, two heat exchangers 3 (e.g., 3C and 3D) are provided for a line 10 and a line 11, which lines 10 and 11 could for example be used to cool external components of the internal combustion engine (i.e. a turbo charger or an intercooler). The heat exchangers 3 (e.g., 3A, 3B, 3C, and 3D) exchange heat with the line 8, which line 8 is provided for guiding a cooling medium. This cooling medium is used to remove heat from the internal combustion engine 1. The removed heat of the internal combustion engine 1 can be used—for example—by a thermal power plant. The flow directions of the circuits through lines 4, 5 and 8 are shown by arrows. There are bypass lines 7 (e.g., first bypass line 7A and second bypass line 7B) arranged parallel to the lines 4, 5. Those bypass lines 7 include at least one pump 6 (e.g., first pump 6A and second pump 6B) and at least one pre-heating device 9 (e.g., first pre-heating device 9A and second pre-heating device 9B). A check valve 12 is arranged in the line 4 of the cooling water circuit to ensure a flow direction of the cooling water circuit during a bypass operation during a pre-heating of the internal combustion engine 1.

Figure 2:
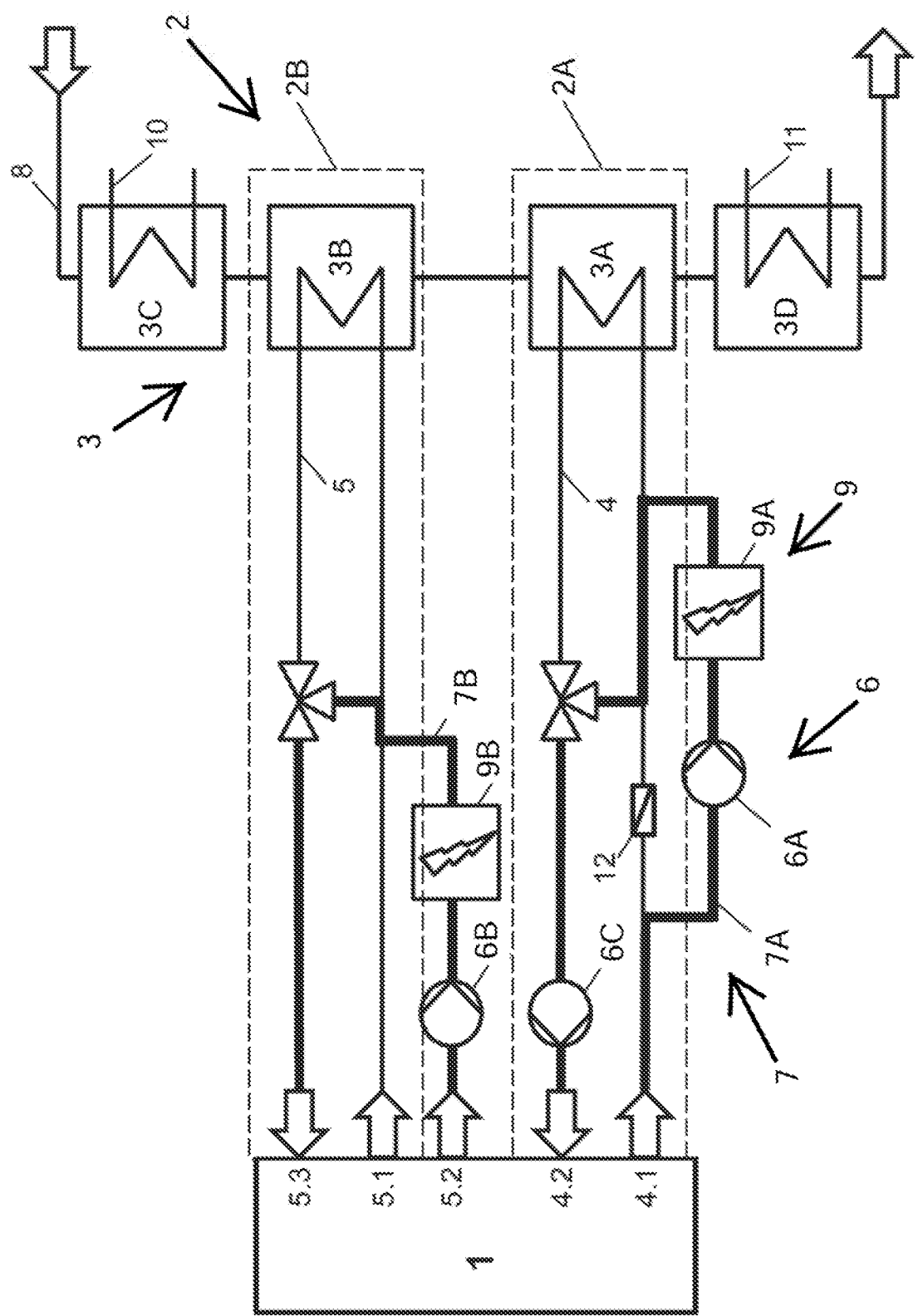
FIG. 2 shows an embodiment of an internal combustion engine having a cooling device as shown in the state of the art during pre-heating.

FIG. 2 shows an internal combustion engine 1 according to the state of the art (the same internal combustion engine 1 as shown in FIG. 1) during a pre-heating operation, which can be done before and/or during a starting operation of the internal combustion engine 1. During the pre-heating of the internal combustion engine 1, the flow of the oil and the cooling water can be redirected through pre-heating devices 9 (e.g., 9A and 9B). In more detail, during a pre-heating operation, the cooling water is lead through a first bypass line 7A, which bypass line comprises a first pump 6A and a pre-heating device 9A. The pump 6A is driven by an independent drive (not shown in the figures), because usually during a pre-heating operation the internal combustion engine 1 is not active and therefore a separate pump 6A with an independent drive is necessary to move the cooling water circuit. The pre-heating device 9A could for example be an electrical heating device. After flowing through the bypass line 7A the cooling water is led back to the internal combustion engine 1 (to the connection point 4.2 of the internal combustion engine 1) by a further bypass line, which bypass line bypasses the heat exchanger 3A. During a pre-heating operation of the internal combustion engine 1, the oil is lead flowing from a connecting point 5.2 of the internal combustion engine (for example a connecting point to the crankcase of the internal combustion engine 1) to a pump 6B—which is also driven by an independent drive—to a pre-heating device 9B for oil and after flowing through this pre-heating device 9B back to the internal combustion engine (to the connection point 5.3 of the internal combustion engine 1) by the use of a bypass line, wherein the heat exchanger 3B can be bypassed. The flow of the oil and the cooling water during a pre-heating operation of the internal combustion engine 1 is shown by the thick lines of FIG. 2.

Figure 3:
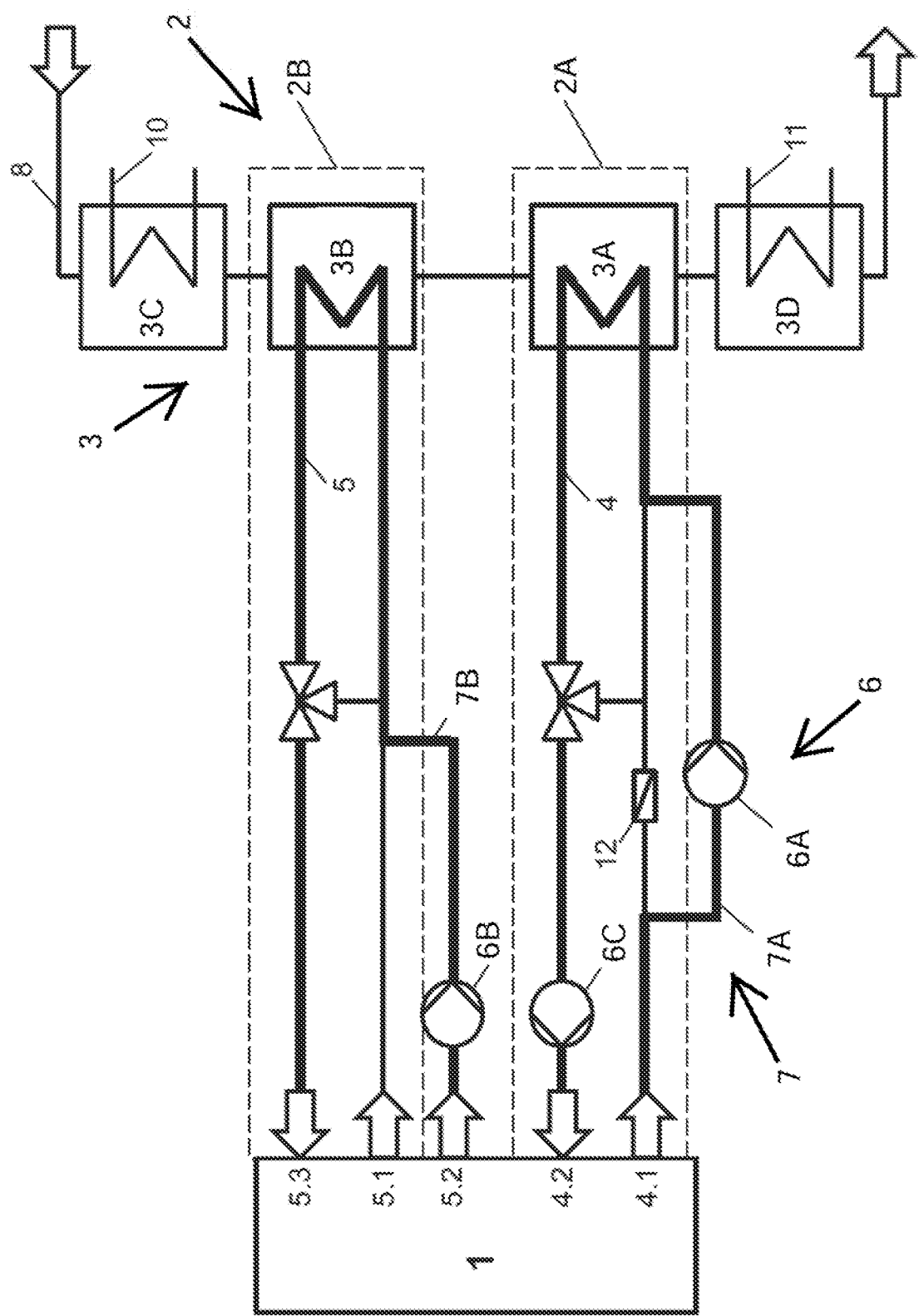
FIG. 3 shows an embodiment of an internal combustion engine according to the disclosure.

FIG. 3 shows an embodiment of an internal combustion engine 1 according to the disclosure during a pre-heating operation, wherein during and/or before a starting operation of the internal combustion engine 1 the cooling device 2 (e.g., 2A and 2B) is configured to pre-heat the internal combustion engine 1, wherein heat is exchanged by the heat exchanger 3 (e.g., 3A and 3B) between the operational liquid and a cooling medium. More specific, the embodiment of FIG. 3 shows a pre-heating of the internal combustion engine 1 during and/or before a starting operation of the internal combustion engine 1, wherein heat is provided from the cooling medium in line 8 to the cooling water in line 4 as well as from the cooling medium in line 8 to the oil circuit in line 5 by the heat exchangers 3 (e.g., 3A and 3B). This is possible because the cooling medium in line 8 has a higher temperature level before and/or during the starting operation of the internal combustion engine 1 than the cooling water and the oil in lines 4, 5.

The oil circuit is driven during the pre-heating operation by a pump 6B arranged in a bypass line 7B, which pump 6B is driven independently from the internal combustion engine 1 and is provided downstream of the connecting point 5.2. The cooling water circuit is driven during the pre-heating operation by a pump 6A, which pump 6A is driven independently from the internal combustion engine 1 and is provided in the bypass line 7A. The bypass line 7A, which comprises the pump 6A, can be bypassed after the starting operation during an operation of the internal combustion engine 1 by the cooling water circuit in line 4. Also, further external components of the internal combustion engine 1 can be pre-heated by the heat exchangers 3 (e.g., 3C and 3D) and the lines 10 and 11. The sequence in which the cooling medium passes through the heat exchangers of the lines 4, 5, 10, 11 can be individually changed.

The invention claimed is:

1. An internal combustion engine, comprising: first and second coolers configured to cool a water and an oil, respectively, of the internal combustion engine after a starting operation and during and/or after operation of the internal combustion engine, wherein the first cooler comprises a first heat exchanger and one or more first lines for transporting the water to and from the first heat exchanger, and the second cooler comprises a second heat exchanger and one or more second lines for transporting the oil to and from the second heat exchanger; and a coolant supply line coupled to the first and second heat exchangers, wherein the coolant supply line is external from the internal combustion engine, wherein the first and second heat exchangers are configured to exchange heat between a coolant and the water and the oil, respectively, wherein the coolant has during the operation of the internal combustion engine a lower temperature than that of the water and the oil of the internal combustion engine; wherein during and/or before the starting operation of the internal combustion engine the first and second coolers are configured to pre-heat the internal combustion engine by the first and second heat exchangers exchanging heat between the coolant and the water and the oil, respectively, wherein the coolant has before and/or during the starting operation of the internal combustion engine a higher temperature level than that of the water and the oil of the internal combustion engine.

2. The internal combustion engine as set forth in claim 1, comprising at least one pump, configured to pump at least one of the water or the oil to and from the first or second heat exchanger, respectively, before and/or during the starting operation of the internal combustion engine.

3. The internal combustion engine as set forth in claim 2, wherein the at least one pump is coupled to a bypass line, wherein the bypass line can be fluidically connected to the first or second heat exchanger before and/or during the starting operation of the internal combustion engine.

4. The internal combustion engine as set forth in claim 1, wherein the first cooler is configured to cool at least one cooling water circuit of the internal combustion engine, wherein the second cooler is configured to cool at least one oil circuit of the internal combustion engine, and wherein the at least one cooling water circuit and the at least one oil circuit of the internal combustion engine can be heated by the first and second coolers before and/or during the starting operation of the internal combustion engine.

5. The internal combustion engine as set forth in claim 1, further comprising at least one additional cooler for at least one external component of the internal combustion engine, wherein the at least one additional cooler is configured to heat the at least one external component of the internal combustion engine before and/or during the starting operation of the internal combustion engine.

6. The internal combustion engine as set forth in claim 5, wherein the at least one external component of the internal combustion engine is a turbo charger and/or an intercooler and/or a fuel cooler.

7. A method for pre-heating an internal combustion engine, the method comprising: cooling, with a coolant supplied via a coolant supply line to first and second heat exchangers, a water and an oil, respectively, of the internal combustion engine after a starting operation and during and/or after operation of the internal combustion engine, wherein the coolant has during the operation of the internal combustion engine a lower temperature than that of the water and the oil of the internal combustion engine, wherein the coolant supply line is external from the internal combustion engine; and pre-heating, with the coolant supplied via the coolant supply line to first and second heat exchangers, the water and the oil, respectively, of the internal combustion engine before and/or during the starting operation of the internal combustion engine, wherein the coolant has before and/or during the starting operation of the internal combustion engine a higher temperature than that of the water and the oil of the internal combustion engine.

8. The method as set forth in claim 7, comprising:
pumping, via a first pump, the water through the first heat exchanger to exchange heat with the coolant before and/or during the starting operation; and pumping, via a second pump, the oil through the second heat exchanger to exchange heat with the coolant before and/or during the starting operation.

9. The method as set forth in claim 8, comprising: routing the water through a first bypass line coupled to an engine water circuit before and/or during the starting operation, wherein the first bypass line comprises the first pump; and
routing the oil through a second bypass line coupled to an engine oil circuit before and/or during the starting operation, wherein the second bypass line comprises the second pump.

10. The method as set forth in claim 8, comprising: driving the first pump independent from the internal combustion engine; and driving the second pump independent from the internal combustion engine.

11. A system, comprising: an engine water circuit configured to circulate water through an internal combustion engine; an engine oil circuit configured to circulate oil through an internal combustion engine; a first heat exchanger coupled to the engine water circuit, wherein a first flow of coolant is configured to flow through the first heat exchanger to exchange heat with the water in the engine water circuit, the first flow of coolant through the first heat exchanger is configured to pre-heat the water before or during a startup operation of the internal combustion engine, and the first flow of coolant through the first heat exchanger is configured to cool the water during operation of the internal combustion engine after the startup operation; a second heat exchanger coupled to the engine oil circuit, wherein a second flow of coolant is configured to flow through the second heat exchanger to exchange heat with the oil in the engine oil circuit, the second flow of coolant through the second heat exchanger is configured to pre-heat the oil before or during the startup operation of the internal combustion engine, and the second flow of coolant through the second heat exchanger is configured to cool the oil during operation of the internal combustion engine after the startup operation; and a coolant supply line coupled to the first and second heat exchangers, wherein the coolant supply line is external from the internal combustion engine, and the coolant supply line is configured to supply the first and second flows of coolant.

12. The system as set forth in claim 11, wherein the first and second heat exchangers are coupled to a coolant circuit configured to circulate the first and second flows of coolant through the first and second heat exchangers.

13. The system as set forth in claim 12, wherein the first and second heat exchangers are arranged in series.

14. The system as set forth in claim 11, comprising: a first pump configured to circulate the water through the first heat exchanger before or during the startup operation; and a second pump configured to circulate the oil through the second heat exchanger before or during the startup operation.

15. The system as set forth in claim 14, wherein the first pump is configured to be driven independent from the internal combustion engine, and the second pump is configured to be driven independent from the internal combustion engine.

16. The system as set forth in claim 15, comprising:
a third pump configured to circulate the water through the first heat exchanger during operation of the internal combustion engine after the startup operation, wherein the third pump is driven by the internal combustion engine.

17. The system as set forth in claim 14, wherein the first pump is disposed along a first bypass line coupled to the engine water circuit, and the second pump is disposed along a second bypass line coupled to the engine oil circuit.

18. The system as set forth in claim 17, wherein the first and second bypass lines exclude preheaters.

19. The system as set forth in claim 14, wherein the first pump comprises a first electric pump and the second pump comprises a second electric pump.

20. The system as set forth in claim 11, comprising the internal combustion engine.

\* \* \* \* \*